(12) United States Patent
Gustavsson

(10) Patent No.: US 6,685,007 B1
(45) Date of Patent: Feb. 3, 2004

(54) SLUICE FOR DISCHARGING BULK MATERIAL

(75) Inventor: Lennart Gustavsson, Växjö (SE)

(73) Assignee: Valmet Fibertech AB (SE)

( * ) Notice: Subject to any disclaimer, the term of this patent is extended or adjusted under 35 U.S.C. 154(b) by 0 days.

(21) Appl. No.: 09/980,818

(22) PCT Filed: May 24, 2000

(86) PCT No.: PCT/SE00/01053
§ 371 (c)(1),
(2), (4) Date: Dec. 5, 2001

(87) PCT Pub. No.: WO00/75056
PCT Pub. Date: Dec. 14, 2000

(30) Foreign Application Priority Data

Jun. 8, 1999 (SE) ................................................. 9902138

(51) Int. Cl.⁷ .............................................. B65G 35/00
(52) U.S. Cl. .................... 198/723; 198/642; 406/52; 406/162
(58) Field of Search .............. 406/52, 62, 162, 406/168, 173, 169; 198/722, 723, 642

(56) References Cited

U.S. PATENT DOCUMENTS

| 521,159 | A | * | 6/1894 | Garraux | 406/62 |
| 4,272,028 | A | * | 6/1981 | Cobb | 239/687 |
| 5,006,018 | A | * | 4/1991 | Depew | 406/152 |
| 5,255,830 | A | * | 10/1993 | Hafner | 222/370 |
| 5,257,691 | A | * | 11/1993 | Spies | 198/642 |
| 5,356,280 | A | * | 10/1994 | Ponzielli | 100/156 |
| 6,416,261 | B2 | * | 7/2002 | Martin | 406/128 |

FOREIGN PATENT DOCUMENTS

| EP | 0 062 386 A1 | 10/1982 |
| WO | WO-96/18564 | 6/1996 |

* cited by examiner

Primary Examiner—Joseph A. Dillon
(74) Attorney, Agent, or Firm—Lerner, David, Littenberg, Krumholz & Mentlik, LLP

(57) ABSTRACT

A sluice (2) for discharging bulk material, in particular fibers, from a cyclone device comprises a circumferential wall (4) in the form of a curved bendable band, which defines a generally cylindrical chamber (10) with an inlet (38) for receiving bulk material from the cyclone device and an outlet (14) for discharging bulk material substantially tangentially from the cylindrical chamber. A sluice wheel (16) is rotatable in the chamber about a vertical axis (12) extending through the center of the sluice wheel for sluicing the bulk material in batches from the inlet through the chamber to the outlet. The inlet (38) is situated centrally above the sluice wheel for supplying bulk material substantially axially to the slice wheel.

10 Claims, 1 Drawing Sheet

SLUICE FOR DISCHARGING BULK MATERIAL

FIELD OF THE INVENTION

The present invention relates to a sluice for discharging bulk material from a cyclone device, comprising a circumferential wall defining a generally cylindrical chamber with an inlet for receiving bulk material from the cyclone device, an outlet for discharging bulk material from the chamber, and a sluice wheel, which is rotatable in the chamber for sluicing bulk material in batches from the inlet through the chamber to the outlet.

BACKGROUND OF THE INVENTION

Sluice devices of the above type maintain a counter pressure in the apex end of the cyclone device, through which the bulk material passes, so that the cyclone device works in the desired manner. In conventional sluices of this kind the sluice wheel rotates about a horizontal axis, wherein the inlet is situated on the top side of the circumferential wall for supplying the bulk material from the cyclone device radially to the sluice wheel and the outlet is situated on the underside of the circumferential wall for discharging the bulk material radially from the sluice wheel. The sluice wheel comprises radial sluice walls defining a number of cells evenly distributed around the horizontal axis of the sluice wheel. The radially outer ends of the sluice walls are provided with rubber seals sealing against the inner side of the circumferential wall, except when the sluice walls passes the inlet and the outlet during rotation of the sluice wheel.

A problem of such a conventional sluice is that bulk material with low density, such as fibers, poorly fills the cells of the sluice wheel, which reduces the capacity of the sluice. The rotational speed of the sluice wheel is limited to a relatively low value, since otherwise the influence of the centrifugal force on the bulk material in the cells of the sluice wheel will be great such that the bulk material simply is prevented from passing through the inlet of the sluice into the bypassing cells. For this reason the capacity of the sluice can not be increased by increasing the rotational speed of the sluice wheel. The solution to this capacity problem in connection with sluicing of bulk material with low density has been to install over-dimensioned, space demanding sluices, which are operated with low rpm.

Another problem of the conventional sluice is that long transition portions are required between the apex end of the cyclone device and the inlet of the sluice to prevent the vortex of the cyclone device from disturbing the filling of the cells of the sluice wheel with bulk material. For applications in which bulk material of fibers are dried in cyclone devices, such transitions portions may need to be up to seven meters long, as seen vertically.

A further problem of the conventional sluice is that the air leakage from the cyclone device through the sluice to the surroundings increases unsatisfactorily rapidly over time, because of the fact that the rubber sealings of the sluice walls age relatively rapidly. In addition, the rubber seals are worn out relatively rapidly because of the fact that material is jammed between the rubber seals and the circumferential wall when the rubber seals again seal against the circumferential wall after having passed the inlet during rotation of the sluice wheel.

One object of the present invention is to provide a sluice that eliminates the above mentioned problems of conventional sluices.

SUMMARY OF THE INVENTION

These and other objects of the present invention have now been realized by the invention of a sluice for discharging bulk material from a cyclone device, comprising a circumferential wall defining a generally cylindrical chamber having an inlet for receiving bulk material from the cyclone device and an outlet extending substantially tangentially to the cylindrical chamber for discharging bulk material therefrom, and a sluice wheel, which is rotatable in the chamber about a vertical axis extending through the center of the sluice wheel for sluicing the bulk material in batches from the inlet through the chamber to the outlet, wherein the inlet is located centrally above the sluice wheel for supplying bulk material substantially axially to the sluice wheel. In a preferred embodiment, the sluice wheel comprises a plurality of at least substantially radial sluice walls including radial inner and outer ends and distributed spaced apart from one another along the circumference of the sluice wheel, the sluice walls abutting sealingly with the radial outer ends against the circumferential wall except at the outlet, and the radial inner ends of the sluice walls are situated at a predetermined distance from the center of the sluice wheel, so that a central free space communicating with the inlet is formed in the sluice wheel. In a preferred embodiment, the sluice wheel comprises a lower circular gable wall and an upper annular circular gable wall, and the sluice walls extend axially between and are connected to the lower and upper gable walls.

In accordance with a preferred embodiment of the apparatus of the present invention, the sluice further comprises a stationary partial cylindrical wall extending in the central space coaxially with the sluice wheel and abutting sealingly against the upper and lower gable walls, wherein the partial cylindrical wall extends past the outlet as seen in the circumferential direction of the sluice wheel. In a preferred embodiment, the radial outer end of each sluice wall abuts sealingly against the circumferential wall except when the sluice wall passes the outlet during rotation of the sluice wheel. In a preferred embodiment, the circumferential wall comprises a curved bendable band including an end which is fixed against movement in the longitudinal direction of the band and an opposite end which is movable in the longitudinal direction of the band for adjustment of the radial extension of the band. Preferably, the opposite end of the band is connected to a pre-stretched draw spring for automatic adjustment of the radial extension of the band, so that a satisfactory sealing between the band and the radial outer ends of the sluice walls is achieved during operation.

In accordance with another embodiment of the apparatus of the present invention, the radial inner end of each sluice wall abuts sealingly against the partial cylindrical wall when the partial cylindrical wall is passed by the sluice wall during rotation of the sluice wheel. Preferably, the partial cylindrical wall has an extension in the circumferential direction of the sluice wheel such that at least one sluice wall seals between the circumferential wall and the partial cylindrical wall at each side of the outlet, as seen in the circumferential direction, independent of the turning position of the sluice wheel.

The objects of the present invention are obtained by a sluice in which the sluice wheel is rotatable about a vertical axis extending through the center of the sluice wheel, that the inlet is situated centrally above the sluice wheel for supplying bulk material substantially axially to the sluice wheel, and that the inlet extends substantially tangentially to the cylindrical chamber. By the fact that the bulk material is axially received by the sluice wheel the influence by the centrifugal force on the bulk material will give the favorable consequence that the bulk material will be packed radially outwardly in the sluice wheel, which gives the sluice according to the present invention a good capacity. In addition, the vortex of the cyclone device can be allowed to extend through the inlet all the way into the sluice wheel without disturbing the filling of the sluice with bulk material, which has the consequence that the length of the transition portion between the cyclone device and the sluice can be made relatively short. For instance, the transition portion needs only be about four meters in length when sluicing bulk material in the form of fibers, which compared to a corresponding transition portion in a conventional sluice means a reduction in length of about 40%. Since the sluice walls of the sluice wheel always abut with their radially outer seals against the inner side of the circumferential wall at the area of inlet, the risk of the bulk material jamming between said seals and the circumferential wall is significantly reduced.

Preferably, the sluice wheel comprises a plurality of at least substantially radial sluice walls, which are distributed spaced from one another along the circumference of the sluice wheel and which with their radial outer ends abut sealingly against the circumferential wall, except at the outlet. The radial inner ends of the sluice walls are suitably situated at a predetermined distance from the center of the sluice wheel, so that a central free space communicating with the inlet is formed in the sluice wheel.

In accordance with a simple design of the sluice wheel it comprises a lower circular gable wall and an upper annular circular gable wall, wherein the sluice walls extend axially between and are connected to the lower and upper gable walls. The lower gable wall may suitably be connected to a drive motor.

To achieve a good air sealing between the central space and the outlet the sluice according to the present invention comprises a stationary part-cylindrical wall extending in the central space coaxially with the sluice wheel and abutting sealingly against the upper and lower gable walls, wherein the part-cylindrical wall extends past the outlet as seen in the circumferential direction of the sluice wheel. Suitably the radially inner end of each sluice wall abuts sealingly against the part-cylindrical wall when the latter is passed by the sluice wall during rotation of the sluice wheel, while the radially outer end of each sluice wall abuts sealingly against the circumferential wall except when the sluice wall passes the outlet during the rotation of the sluice wheel.

The part-cylindrical wall has such an extension in the circumferential direction of the sluice wheel that at least one sluice wall seals between the circumferential wall and the part-cylindrical wall on each side of the outlet, as seen in circumferential direction, independent of the turning position of the sluice wheel.

The circumferential wall may comprise a curved bendable band with one end fixed against movement in the longitudinal direction of the band and with one opposite end which is moveable in the longitudinal direction of the band for adjustment of the radial extension of the band. As a result, when required the band can be adjusted concurrently with the wear of the radial outer ends or seals of the sluice walls. The opposite ends of the band are advantageously connected to a pre-stretched draw spring or air cylinder for automatic adjustment of the radial extension of the band, so that a satisfactory sealing between the band and the radially outer ends of the sluice walls are achieved during operation. Alternatively, a circumferential wall may of course be stationary and the radially outer ends of the sluice wall may be provided with conventional sealing rubber lips.

BRIEF DESCRIPTION OF THE DRAWINGS

The present invention will be appreciated with reference to the following detailed description which, in turn, refers to the accompanying drawings in which.

DETAILED DESCRIPTION

Figure 1:
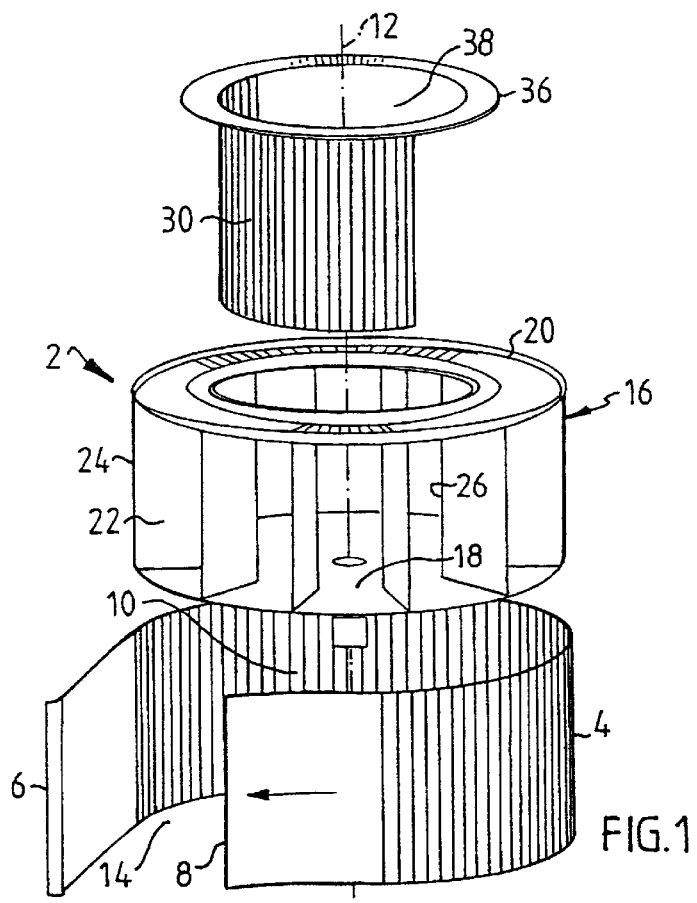
FIG. 1 is a front, perspective, exploded view of a sluice according to the present invention.

FIG. 1 shows a sluice 2 according to the present invention for discharging bulk material from a cyclone device (not shown). The sluice 2 comprises a circumferential wall in the form of a bendable steel band 4, which has two free ends 6 and 8 and which defines a generally cylindrical chamber 10 with a vertical center axis 12. The two free ends 6 and 8 of the steel band 4 are situated spaced from each other and define an outlet 14 extending substantially tangentially to the cylindrical chamber 10. A sluice wheel 16 is situated in the chamber 10 and is rotatable about the vertical axis 12 on bearings not shown. The sluice wheel 16 comprises a lower circular gable wall 18, which is connectable to a drive motor not shown, an upper annular circular gable wall 20, and twelve radial sluice walls 22 extending axially between and connected to the lower gable wall 18 and the upper gable wall 20. The sluice walls 22 are evenly distributed spaced from one another along the circumference of the sluice wheel 16 and abut with their radially outer ends 24 against the steel band 4, possibly by means of rubber seals, except at the outlet 14. The radially inner ends 26 of the sluice walls 22 are situated at a predetermined distance from the center of the sluice wheel 16, so that a central free space 28 is formed in the sluice wheel 16.

A stationary partial cylindrical wall 30 extends in the central free space 28 in the sluice wheel 16 coaxially thereto and abut sealingly against the annular upper gable wall 20 and the lower gable wall 18, possibly by means of rubber seals not shown. The radially inner end 26 of each sluice wall 22 abut sealingly against the partial cylindrical wall 30, possibly via a rubber seal, when the wall 30 is passed by the sluice wall 22 during rotation of the sluice wheel 16. As seen in the circumferential direction of the sluice wheel 16 the wall 30 extends past the outlet 14, so that a discharge passage 32, through which the sluice walls 16 move towards the outlet 14, and a return passage 34, through which the sluice walls 16 move from the outlet 14, is formed between the steel band 4 and the wall 30. The wall 30 has such a long extension in the circumferential direction of the sluice wheel 16 that at least one sluice wall 22 is in the discharge passage 32 and the return passage 34, respectively, independent of the turning position of the sluice wheel 16, A circular sealing flange 36 is coaxially attached to the upper end of the partial cylindrical wall 30 and defines an inlet 38 for the bulk material. For the sake of clarity the sealing flange 36 has been omitted in FIG. 2.

Figure 2:
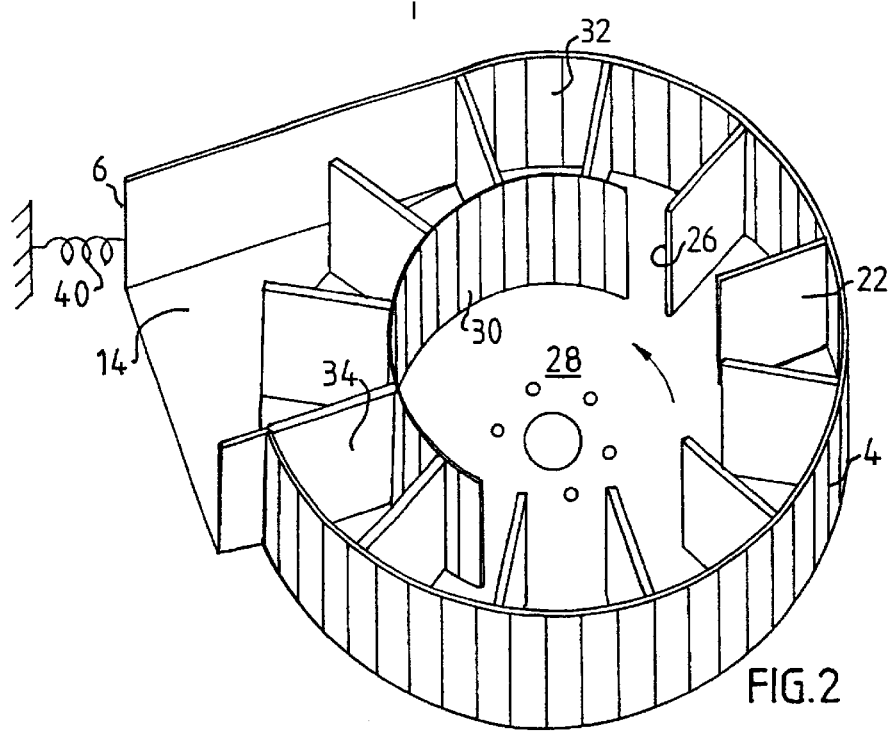
FIG. 2 is a top, perspective, enlarged view of the sluice shown in FIG. 1 in an assembled state.

One end 8 of the steel band 4 is fixed against movement in the longitudinal direction of the steel band 4, while the other end 6 is connected to a pre-stretched draw spring 40, as schematically shown in FIG. 2. The draw spring 40 provides automatic adjustment of the radial extension of the steel band 4, so that a satisfactory sealing between the steel band 4 and the outer ends 24 of the sluice walls 22 is achieved for a long operation of the sluice 2.

The function of the sluice 2 according to the present invention is described in the following in connection with discharging bulk material in the form of fibers from a cyclone device, which constitutes an important application of the sluice according to the invention.

The sluice 2 is connected to a cyclone device for drying fibers (a cyclone device of this kind can have a dimension in height of more than 20 meters), so that the lower narrow part of the conical separation chamber of the cyclone device communicates with the inlet 38 of the sluice 2 via a relatively short transition portion of about four meters. The fibers are blown into the separation chamber of the cyclone device, so that a vortex of the mixture of air and fibers is generated therein. The vortex extends through the transition portion axially down into the central free space 28 of the sluice wheel through the inlet 38. In the space 28 the now dried fibers are thrown radially outwardly and are packed together in the open cells that are defined by six of the sluice walls 22, which are in fiber-receiving positions in the chamber 10. The drive motor not shown rotates the sluice wheel 16 counter clockwise in the same rotational direction as the vortex of the cyclone device, as indicated by an arrow in FIG. 2, so that the fibers are transported by the sluice walls 22 through the discharge passage 32 to the outlet 14. The sluice wheel 16 is rotated fast such that fibers that from the discharge passage 32 enter the outlet 14 directed tangentially to the chamber 10 are thrown by the centrifugal force from the cells between the sluice walls 22 out of the outlet 14. The sluice walls 22 that define emptied cells in the outlet 14 return through the return passage 34 to said fibers receiving positions in the chamber 10, whereafter the above described course is repeated.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A sluice adapted for discharging air entrained bulk material from a cyclone, comprising:
    a circumferential wall defining a generally cylindrical chamber having an inlet adapted for receiving said bulk material from said cyclone and an outlet extending substantially tangentially to said cylindrical chamber for discharging bulk material therefrom, and
    a sluice wheel comprising a lower gable wall which is rotatable in said chamber about a vertical axis extending through the center of said sluice wheel for sluicing said bulk material in batches from said inlet through said chamber to said outlet, said sluice wheel rotating at a speed sufficient to create a centrifugal force so as to radially pack outwardly said bulk material away from said vertical axis of said sluice wheel,
    wherein said inlet is located centrally above said sluice wheel supplying bulk material substantially axially to said lower gable wall of said sluice wheel.

2. A sluice according to claim 1, wherein said sluice wheel comprises a plurality of at least substantially radial sluice walls including radial inner and outer ends and distributed spaced apart from one another along the circumference of said sluice wheel, said sluice walls abutting sealingly with said radial outer ends against said circumferential wall except at said outlet, and said radial inner ends of said sluice walls are situated at a predetermined distance from the center of said sluice wheel, so that a central free space communicating with said inlet is formed in said sluice wheel.

3. A sluice according to claim 2, wherein said lower gable wall of said sluice wheel is circular and said sluice wheel comprises an upper annular circular gable wall, and said sluice walls extend axially between and are connected to said lower and upper gable walls.

4. A sluice according to claim 3, further comprising a stationary partial cylindrical wall extending in said central space coaxially with said sluice wheel and abutting sealingly against said upper and lower gable walls, wherein said partial cylindrical wall extends past said outlet as seen in the circumferential direction of said sluice wheel.

5. A sluice according to claim 4, wherein the radial outer end of each sluice wall abuts sealingly against said circumferential wall except when said sluice wall passes said outlet during rotation of said sluice wheel.

6. A sluice according to claim 5, wherein said circumferential wall comprises a curved bendable band including an end which is fixed against movement in the longitudinal direction of said band and an opposite end which is movable in the longitudinal direction of said band for adjustment of the radial extension of said band.

7. A sluice according to claim 6, wherein said opposite end of said band is connected to a pre-stretched draw spring for automatic adjustment of the radial extension of said band, so that a satisfactory sealing between said band and the radial outer ends of said sluice walls is achieved during operation.

8. A sluice according to claim 4, wherein said radial inner end of each sluice wall abuts sealingly against said partial cylindrical wall when the partial cylindrical wall is passed by said sluice wall during rotation of said sluice wheel.

9. A sluice according to claim 8, wherein said partial cylindrical wall extends in the circumferential direction of said sluice wheel such that at least one sluice wall seals between said circumferential wall and said partial cylindrical wall at each side of said outlet, as seen in the circumferential direction, independent of the turning position of said sluice wheel.

10. A sluice adapted for discharging bulk material from a cyclone, comprising:
    a circumferential wall defining a generally cylindrical chamber having an inlet for receiving said bulk material from the cyclone and an outlet extending substantially tangentially to said cylindrical chamber for discharging bulk material therefrom, and
    a sluice wheel, which is rotatable in said chamber about a vertical axis extending through the center of said sluice wheel for sluicing said bulk material in batches from said inlet through said chamber to said outlet,
    wherein said inlet is located centrally above said sluice wheel for supplying bulk material substantially axially to said sluice wheel,
    wherein said sluice wheel comprises a plurality of at least substantially radial sluice walls including radial inner and outer ends and distributed spaced apart from one another along the circumference of said sluice wheel, said sluice walls abutting sealingly with said radial outer ends against said circumferential wall except at said outlet, and said radial inner ends of said sluice walls are situated at a predetermined distance from the center of said sluice wheel, so that a central free space communicating with said inlet is formed in said sluice wheel.

* * * * *

UNITED STATES PATENT AND TRADEMARK OFFICE
CERTIFICATE OF CORRECTION

PATENT NO. : 6,685,007 B1
DATED : February 3, 2004
INVENTOR(S) : Lennart Gustavsson It is certified that error appears in the above-identified patent and that said Letters Patent is hereby corrected as shown below:

<u>Title page,</u>
Item [57], ABSTRACT, delete and therefor the following:
-- A sluice for discharging bulk material from a cyclone is provided including a circumferential wall defining a cylindrical chamber with an inlet for receiving bulk material from the cyclone and an outlet substantially tangential to the chamber, and a sluice wheel rotatable in the chamber for sluicing the bulk material in batches from the inlet to the outlet, the inlet being located centrally above the sluice wheel for supplying bulk material substantially axially to the sluice wheel. --

Signed and Sealed this

First Day of June, 2004

JON W. DUDAS
*Acting Director of the United States Patent and Trademark Office*